United States Patent
Koyama (10) Patent No.: US 9,213,170 B2
(45) Date of Patent: Dec. 15, 2015

(54) LENS BARREL AND OPTICAL APPARATUS

(71) Applicant: CANON KABUSHIKI KAISHA, Tokyo (JP)

(72) Inventor: Atsushi Koyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 18 days.

(21) Appl. No.: 14/078,676

(22) Filed: Nov. 13, 2013

(65) Prior Publication Data

US 2014/0133035 A1 May 15, 2014

(30) Foreign Application Priority Data

Nov. 15, 2012 (JP) ................................ 2012-250755

(51) Int. Cl.
*G02B 15/10* (2006.01)
*G02B 7/14* (2006.01)
*G02B 7/10* (2006.01)

(52) U.S. Cl.
CPC ............... *G02B 15/10* (2013.01); *G02B 7/102* (2013.01); *G02B 7/14* (2013.01)

(58) Field of Classification Search
CPC ............ G02B 7/026; G02B 7/14; G02B 7/16; G02B 15/10
See application file for complete search history.

(56) References Cited

U.S. PATENT DOCUMENTS

| 4,525,050 A * | 6/1985 | Ohashi ............................ 396/75 |
| 2005/0276591 A1* | 12/2005 | Shimakura ...................... 396/73 |
| 2007/0177865 A1* | 8/2007 | Nomura et al. ................ 396/349 |

FOREIGN PATENT DOCUMENTS

| JP | 06-201979 A | 7/1994 |
| JP | 11-101933 A | 4/1999 |

* cited by examiner

*Primary Examiner* — Jordan Schwartz
(74) *Attorney, Agent, or Firm* — Rossi, Kimms & McDowell LLP (57) ABSTRACT

A lens barrel includes an image-pickup optical system that includes a main optical system and an extender optical system, an extender barrel configured to hold the extender optical system, a housing configured to house the extender barrel, a rotator configured to hold the extender barrel to rotatably support the extender barrel in the housing, to insert the extender optical system into the main optical system, and to retreats the extender optical system from the main optical system, and a retreat restraint. When the retreat restraint is in the first state, the extender optical system is retreated to a position which is not associated with formation of the optical image, but the extender optical system is undetachable from the rotator, and when the retreat restraint is in the second state, the extender optical system is detachable from the rotator.

8 Claims, 9 Drawing Sheets

LENS BARREL AND OPTICAL APPARATUS

BACKGROUND OF THE INVENTION

1. Field of the Invention

The present invention relates to a lens barrel and an optical apparatus.

2. Description of the Related Art

In a single lens reflex camera system, there is known a lens system that extends a focal length by inserting an intermediate adaptor having an extender optical system configured to shift the focal length to a telephoto side between a camera body and an interchangeable lens. In a TV camera system, there is also known an optical system that includes an extender exchanger of changing a focal length of the entire system by inserting or retreating a lens unit having an extender optical system into or from a part of an optical path of an imaging lens (zoom lens).

In order to attach the intermediate adaptor to the camera body, it is necessary to detach the interchangeable lens from the camera body and to install the intermediate adaptor to the interchangeable lens. However, this manipulation is unnecessary for an extender built-in exchanger type. Therefore, in order to employ an extender built-in exchanger type in a single lens reflex camera system, Japanese Patent Laid-Open No. ("JP") 06-201979 proposes a configuration of inserting or detaching an extender optical system into or from an optical path between a front relay-lens unit and a rear relay-lens unit constituting a zoom lens.

However, in the configuration of JP 06-201979, in order to detach the extender optical system, one of the front and rear relay-lens units needs to be detached. However, detaching of one of the front and rear relay-lens units would disadvantageously change the optical performance of an image-pickup optical system.

SUMMARY OF THE INVENTION

The present invention can provide a lens barrel and an optical apparatus where an extender optical system is replaceable at necessary time in the extender optical system without detaching any one of optical units before and after the extender optical system.

A lens barrel according to the present invention includes an image-pickup optical system configured to form an optical image of an object, the image-pickup optical system including a main optical system and an extender optical system configured to change a focal length of the main optical system, an extender barrel configured to hold the extender optical system, a housing configured to house the extender barrel, a rotator configured to hold the extender barrel to rotatably support the extender barrel in the housing, to insert the extender optical system into the main optical system, and to retreats the extender optical system from the main optical system, and a retreat restraint which has a first state used to restrain a retreating amount of the extender barrel by the rotator and a second state used to make the retreating amount of the extender barrel larger than that in the first state. When the retreat restraint is in the first state, the extender optical system is retreated to a position which is not associated with formation of the optical image, but the extender optical system is undetachable from the rotator, and when the retreat restraint is in the second state, the extender optical system is detachable from the rotator.

Further features of the present invention will become apparent from the following description of exemplary embodiments with reference to the attached drawings.

DESCRIPTION OF THE EMBODIMENTS

Figure 1:
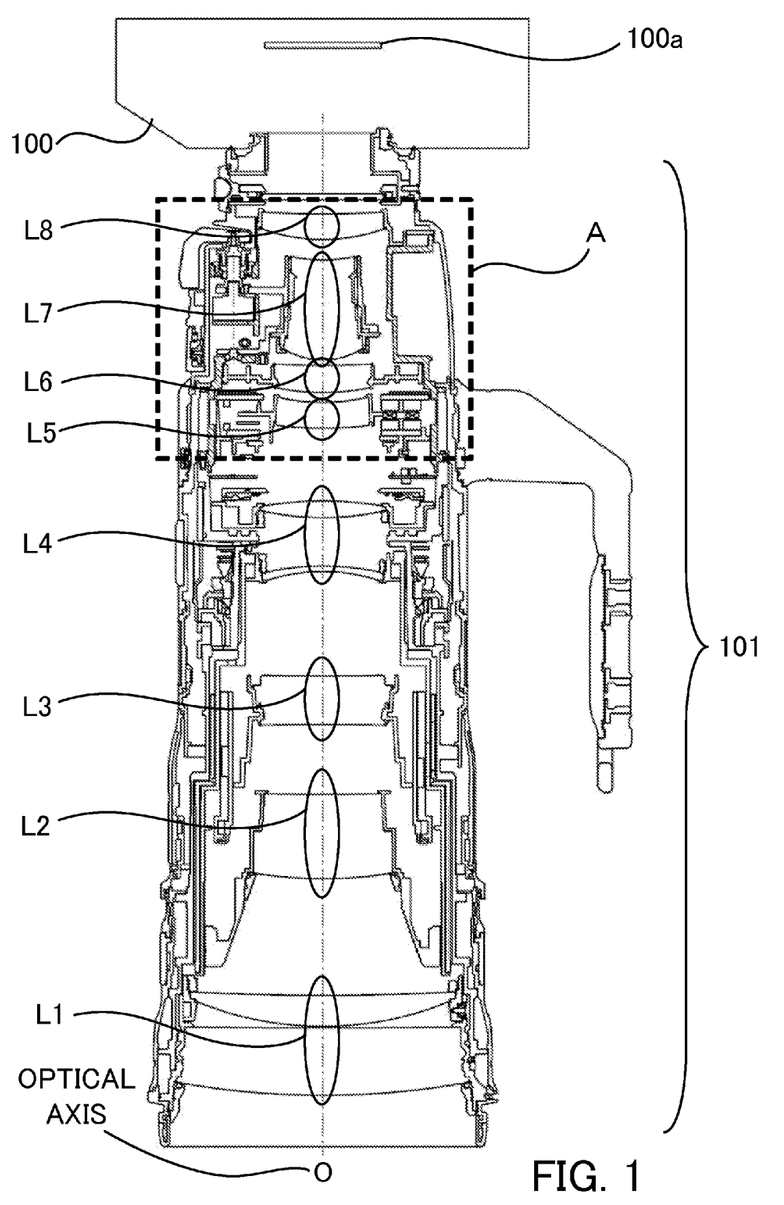
FIG. 1 is a schematic sectional view of an interchangeable lens according to this embodiment and a camera body to which the interchangeable lens is attached.
Figure 2:
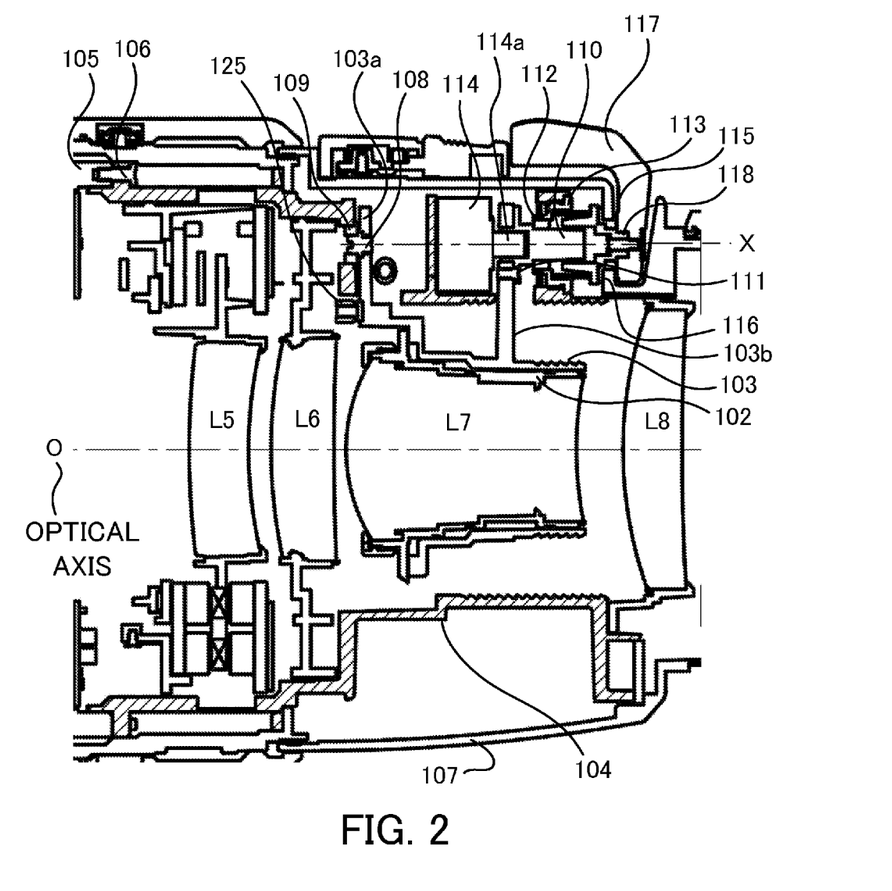
FIG. 2 is an enlarged sectional view of an A portion indicated by a dotted line in FIG. 1.

FIG. 1 is a schematic sectional view of a camera body 100 and an interchangeable lens (lens barrel, optical apparatus) 101 according to an embodiment which can be attached to the camera body 100. The camera body 100 and the lens barrel 101 constitute a camera system (optical apparatus). FIG. 2 is an enlarged sectional view of an A portion illustrated in FIG. 1 and illustrates an extender optical system according to the embodiment and a rotation mechanism thereof.

The camera body 100 is configured as a single lens reflex camera (image pickup apparatus, optical apparatus) and includes an image sensor 100a configured to photoelectrically convert an optical image. The camera body 100 may be, but not limited to, a digital still camera, a digital video camera, and a mirror-less camera. The interchangeable lens 101 contains an image pickup optical system for forming an optical image of an object. The image pickup optical system has an 8-unit structure including first to eighth lens units L1 to L8 which are arranged in this order from the object side.

The first to sixth and eighth lens units L1 to L6 and L8 constitute the main optical system, and the seventh lens unit L7 is an extender optical system configured to change a focal length of the main optical system.

The second lens unit L2 and the third lens unit L3 are zoom lenses which move in the optical axis direction during zooming to adjust the focal length. The third lens unit L3 is a focus lens configured to move in the optical axis direction for focusing. The fifth lens unit L5 is a correction lens which is movable in the direction perpendicular to an optical axis O in order to correct image blur caused by hand shaking or the like.

The seventh lens unit L7 can be inserted into or retreated from the main optical system. As illustrated in FIG. 1, when the seventh lens unit L7 is inserted into the main optical system, the seventh lens unit L7 changes the focal length to the telephoto side.

The seventh lens unit L7 is held by a seventh lens unit barrel (extender barrel) 102, and the seventh lens unit barrel 102 is fixed to a holder cylinder 103. The holder cylinder 103 constitutes a rotator together with a first rotating shaft unit 108, a second rotating shaft unit 110, and the like described below. The rotator holds the seventh lens unit barrel 102 to rotatably support the seventh lens unit barrel 102 in a fixed cylinder 104 and serves to insert the seventh lens unit L7 into the main optical system and to retreat the seventh lens unit L7 from the main optical system.

The fourth lens unit L4 to the sixth lens unit L6 are the front relay-lens units, and the eighth lens unit L8 is the rear relay-lens unit. The holder cylinder 103 holds the seventh lens unit barrel 102 to rotatably support the seventh lens unit barrel 102 in the fixed cylinder 104 so as to allow the seventh lens unit barrel 102 to be rotated around a rotating shaft X. The rotating shaft X is parallel to the optical axis O. The fixed cylinder 104 is a housing configured to receive the extender barrel. The fixed cylinder 104 is fixed to an intermediate cylinder 105 through a screw 106. An exterior ring 107 is fixed to an end surface of the image pickup element 100a side of the fixed cylinder 104 through a screw (not illustrated).

A detailed description will now be given of a configuration for rotatably support the holder cylinder 103.

A first arm 103a extending from the optical axis O in the direction of the rotating shaft X is installed at the object side of the holder cylinder 103, and a first rotating shaft unit 108 is attached to the front end of the first arm 103a. The central axis of the first rotating shaft unit 108 is coaxial with the rotating shaft X, and the first rotating shaft unit 108 protrudes from the front end of the first arm 103a toward the object side. The protruding portion of the first rotating shaft unit 108 is inserted into the inner wheel of the first flanged ball bearing 109 which is fixed to the fixed cylinder 104 so as to be coaxial with the rotating shaft X.

A second arm 103b extending from the optical axis O of the image-pickup optical system in the direction of the rotating shaft X (in the radial direction) is installed in the image plane side of the holder cylinder 103. A second rotating shaft unit 110 is fixed to the front end of the second arm 103b through a screw 111. The central axis of the second rotating shaft unit 110 is coaxial with the rotating shaft X, and the second rotating shaft unit 110 protrudes from the front end of the second arm 103b toward the image plane side. A second flanged ball bearing 112 is disposed around the second rotating shaft unit 110.

A pressure ring 113 is fixed onto the fixed cylinder 104 so that the central axis thereof is coaxial with the rotating shaft X. The front end of the pressure ring 113 contacts a flange portion of the second flanged ball bearing 112, and the inner circumference thereof is engaged with the outer circumference of the outer wheel of the second flanged ball bearing 112. Therefore, the inner wheel of the second flanged ball bearing 112 contacts the end portion of the second rotating shaft unit 110, and the position of the holder cylinder 103 in the direction of the optical axis O is restrained.

A rotary damper 114 is a damper having damping effect generated by viscosity resistance of oil contained and sealed therein. A base portion of the rotary damper 114 is fixed onto the fixed cylinder 104. A top shank 114a of the rotary damper 114 is rotated, and the top shank 114a undergoes plane-parallel cutting and is inserted into a plane-parallel cut hole disposed at the object side of the second rotating shaft unit 110 to be engaged. As illustrated in the second rotating shaft unit 110 of FIG. 9 described later, the "plane-parallel cutting" denotes a process of forming a shape by cutting a cylinder into two parallel planes.

As a result, the holder cylinder 103 is rotatably supported by the fixed cylinder 104, and the position thereof in the optical axis direction is restrained.

A description will now be given of the configuration where the seventh lens unit L7 (extender optical system) is inserted into or retreated from the main optical system.

A bearing 115 is fixed onto an exterior ring 107 so that the bearing 115 is coaxial with the rotating shaft X. An extender lever shaft 116 is rotatably fitted to the inner circumference of the bearing 115, and a flange portion of the extender lever shaft 116 contacts a flange portion of the bearing 115. The front end of the image plane side of the extender lever shaft 116 undergoes plane-parallel cutting and engages with a plane-parallel cut hole disposed in the extender lever 117 as a manipulator to be engaged. By fixing through a screw 118 from the inner side, the extender lever shaft 116 and the extender lever 117 interpose the exterior ring 107 and the bearing 115.

If the exterior ring 107 attached to the extender lever 117 is attached to the fixed cylinder 104, the plane-parallel cut hole disposed at the end portion of the object side of the extender lever shaft 116 is engaged with the plane-parallel cutting base portion formed at the front end of the image plane side of the second rotating shaft unit 110.

Therefore, the extender lever 117 and the holder cylinder 103 are connected to each other, and if the extender lever 117 is rotated, the holder cylinder 103 and the seventh lens unit L7 are also rotated around the rotating shaft X. As a result, the extender optical system can be inserted into or retreated from the main optical system.

Figure 3:
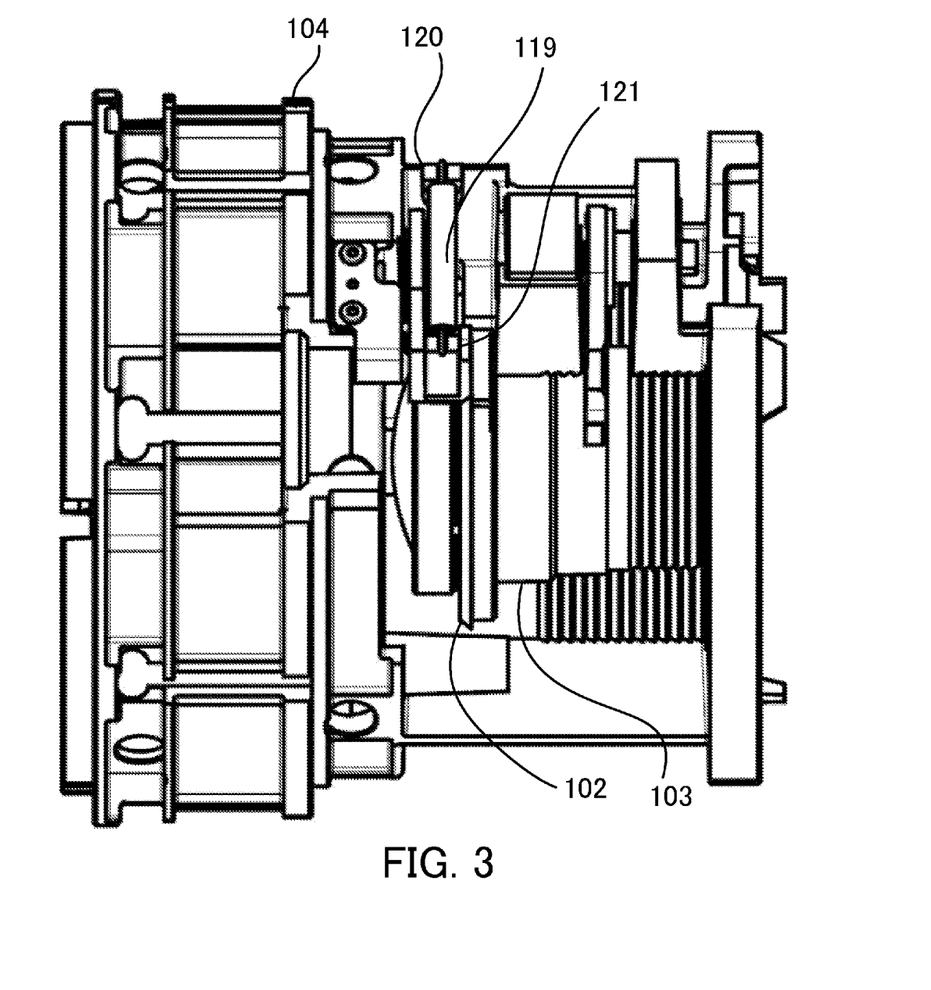
FIG. 3 is a side view when an extender optical system illustrated in FIG. 1 is inserted into a main optical system.
Figure 4:
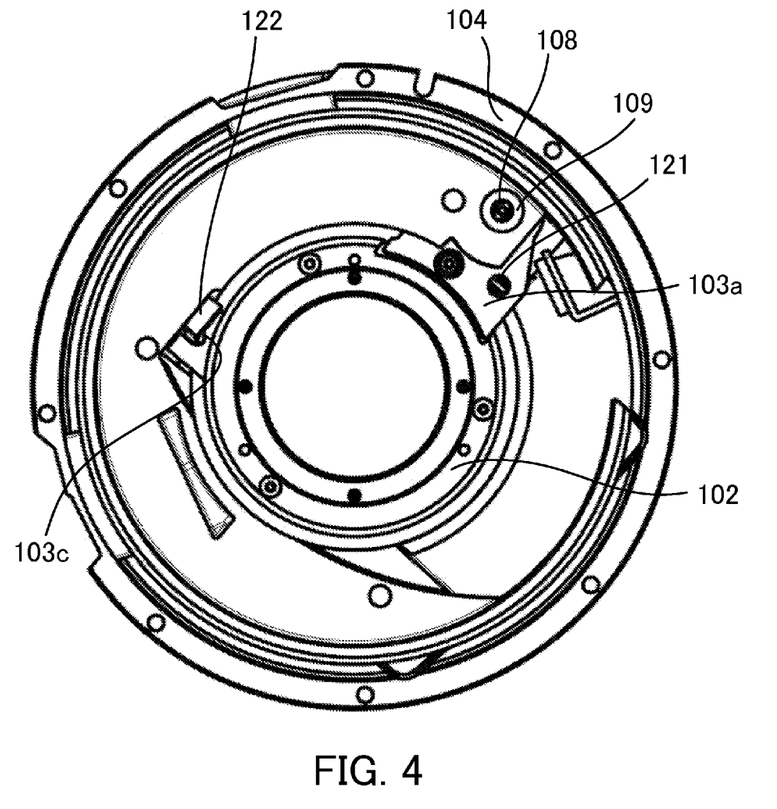
FIG. 4 is a front view of a principal part in the state illustrated in FIG. 3.

Referring now to FIGS. 3 and 4, a description will be given of the position restraint when the seventh lens unit L7 is rotated around the rotating shaft X to be inserted into the main optical system. FIG. 3 is a side view when the extender optical system is inserted into the main optical system. FIG. 4 is a front view (a plan view seen from the object side) of the principal part of the embodiment in the state illustrated in FIG. 3.

An extender spring 119 is a tensile coil spring with hook-shaped portions formed at two ends thereof and is a biasing unit for biasing the holder cylinder 103 in the insertion direction. The one end of the extender spring 119 is engaged with a shaft 120 installed in the fixed cylinder 104, and the other end thereof is engaged with a shaft 121 installed in the holder cylinder 103 (first arm 103a thereof). The shaft 120 and the shaft 121 are installed at the positions where, when the holder cylinder 103 is rotated around the rotating shaft X, the tensile spring force of the extender spring 119 is in maximum at the middle position between the insertion position and the retreat position. In addition, the extender spring 119 is set so as to exert the tensile spring force even in the insertion position and the retreat position.

A first rotation restraint 122 is fixed onto a planar portion installed at the inner circumference cylinder of the fixed cylinder 104. The first rotation restraint 122 contacts the seventh lens unit barrel 102 or a component connected thereto so as to function as an insertion restraint for restraining the insertion position of the seventh lens unit barrel 102. In this embodiment, when the first rotation restraint 122 contacts a protruding portion 103c of the holder cylinder 103, the optical axis O and the optical axis of the seventh lens unit L7 are coincident with each other.

Figure 5:
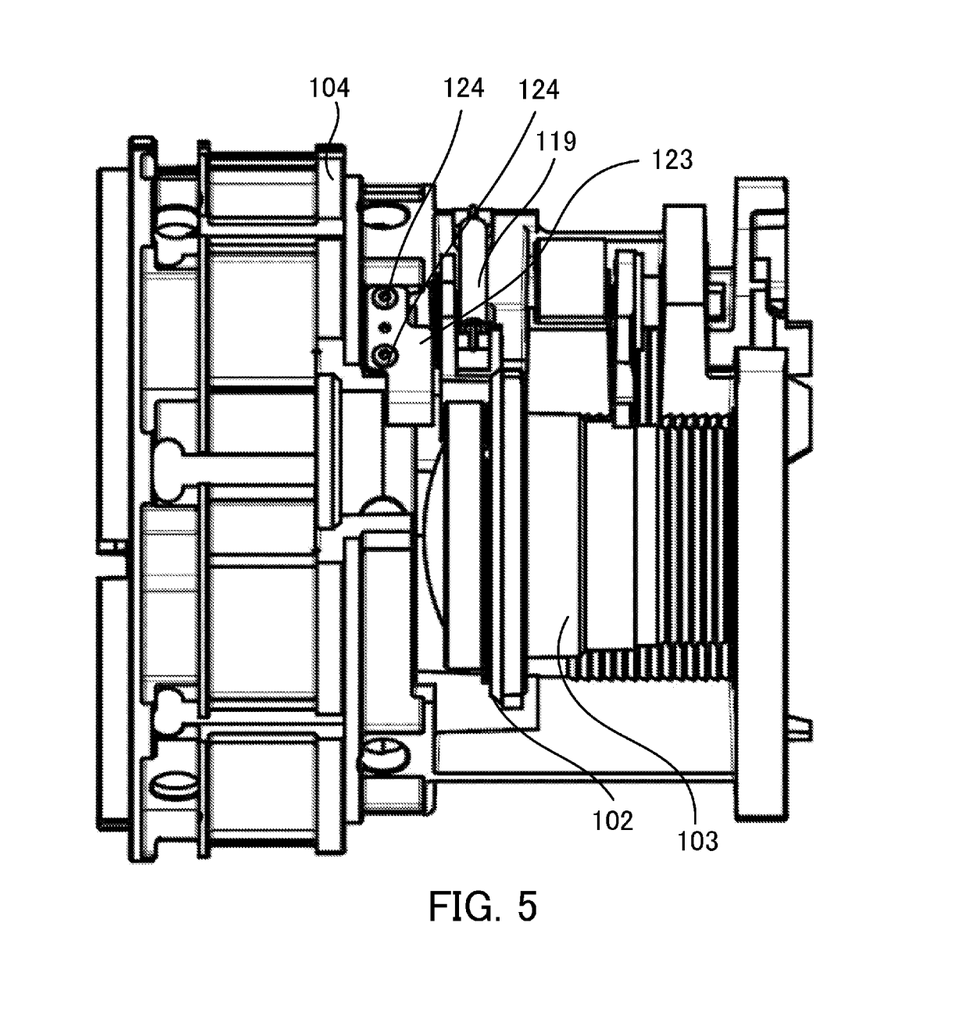
FIG. 5 is a side view when the extender optical system illustrated in FIG. 1 is retreated from the main optical system.
Figure 6:
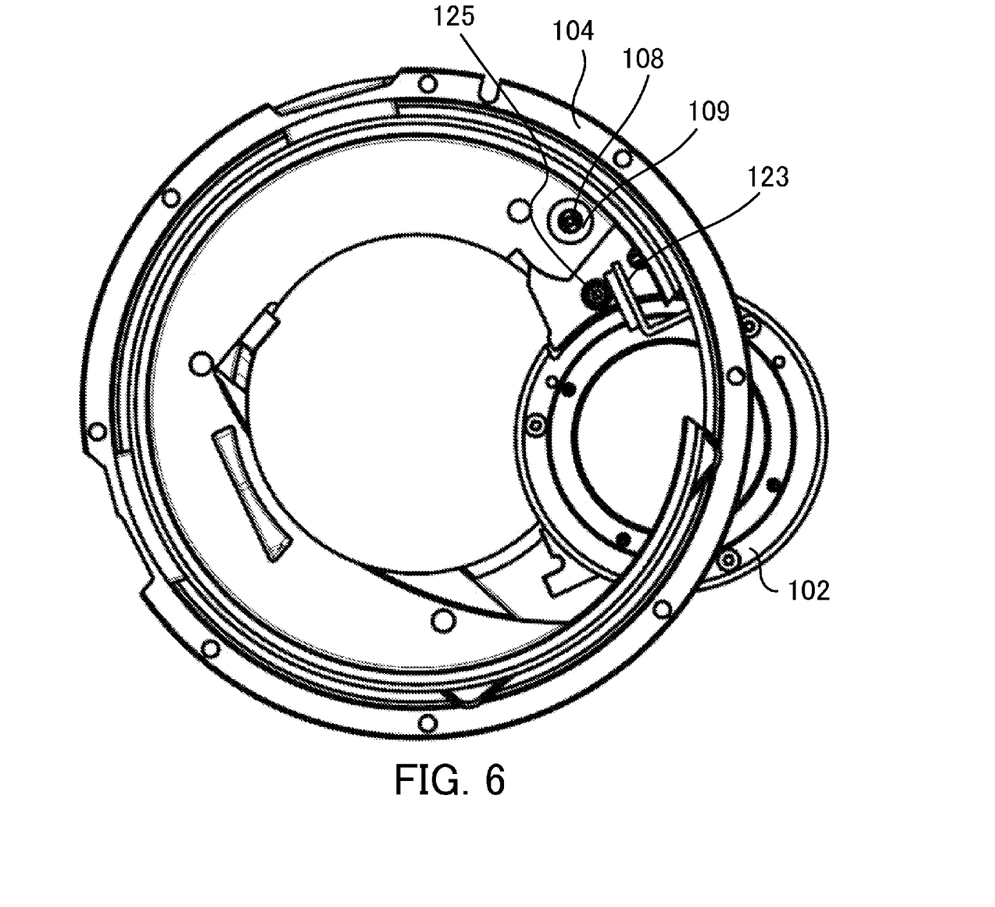
FIG. 6 is a front view of the principal part in the state illustrated in FIG. 5.

Referring now to FIGS. 5 and 6, a description will be given of the position restraint when the seventh lens unit L7 is rotated around the rotating shaft X to be retreated from the main optical system. FIG. 5 is a side view when the extender optical system is retreated from the main optical system. FIG. 6 is a front view of the principal part of this embodiment in the state illustrated in FIG. 5.

A second rotation restraint (retreat restraint) 123 is fixed onto the outer circumference of the fixed cylinder 104 through a screw 124. A roller 125 is fixed onto the holder cylinder 103. When the roller contacts an inner wall portion 123a of the second rotation restraint 123, the seventh lens unit L7 is restrained to the position where the seventh lens unit L7 is retreated from the main optical system. In this state, since the front relay-lens units (fourth to sixth lens units L4 to L6) and the rear relay-lens unit (eighth lens unit L8) are located before and after the seventh lens unit L7, it is impossible to detach only the seventh lens unit L7.

Figure 7:
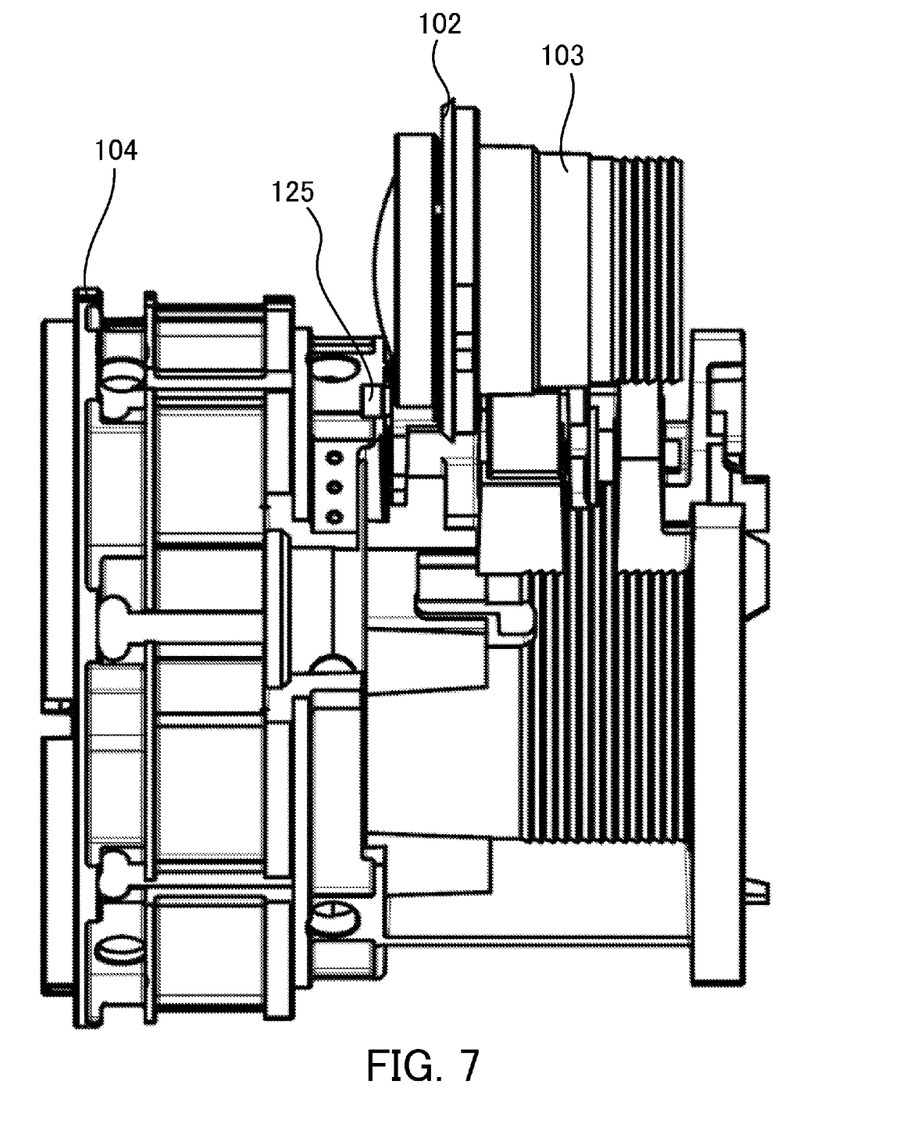
FIG. 7 is a side view when a second rotation restraint is detached and the extender optical system is further rotated from the state illustrated in FIG. 5.
Figure 8:
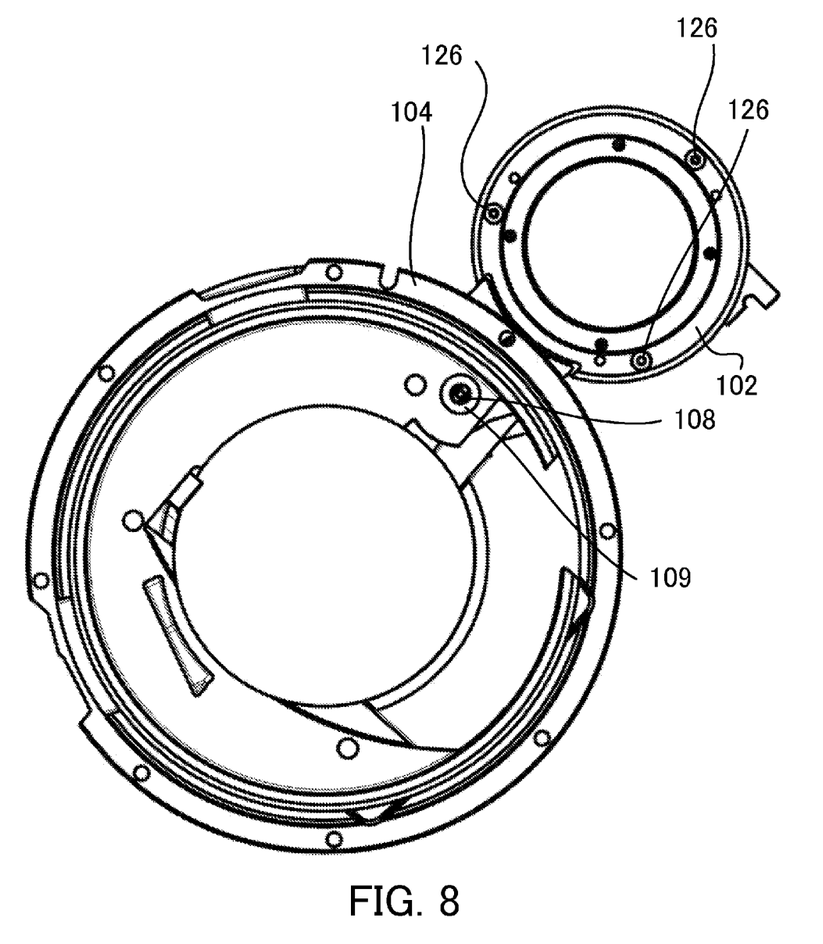
FIG. 8 is a front view of a principal part in the state illustrated in FIG. 7.
Figure 9:
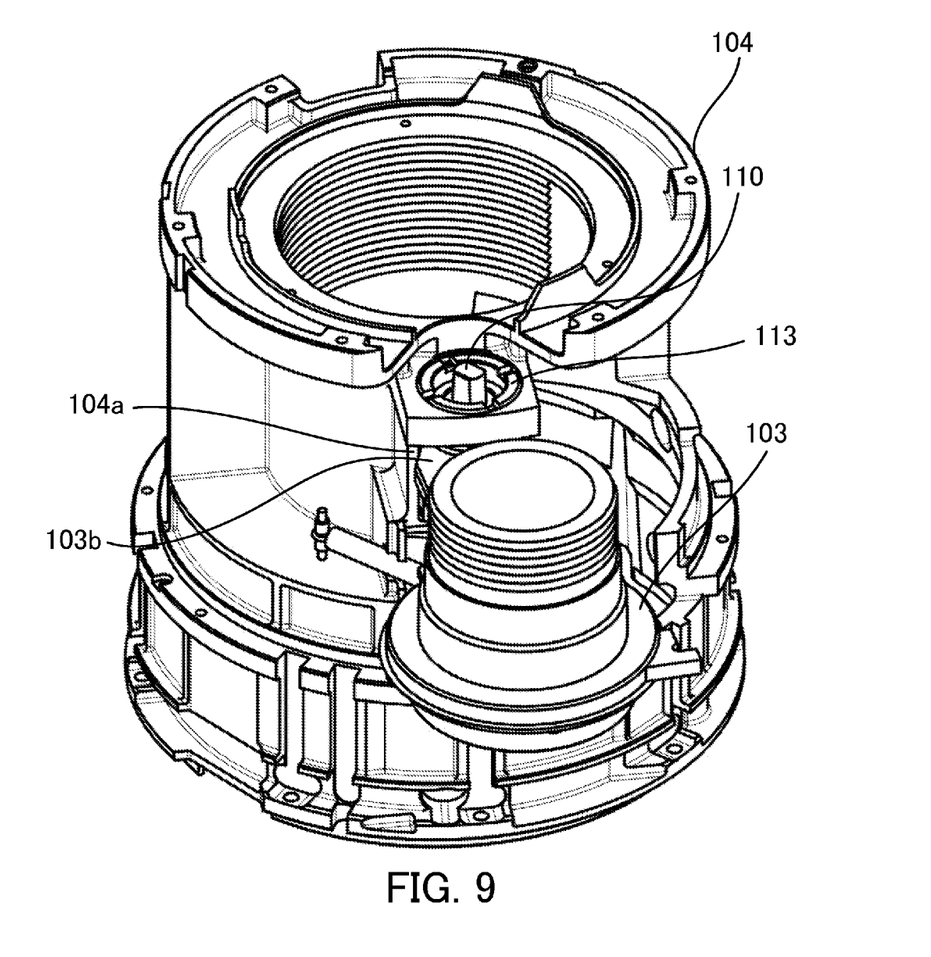
FIG. 9 is a perspective view of a principal part in the state illustrated in FIG. 7.

Referring now to FIGS. 7, 8, and 9, a description will be given of a detachment of the second rotation restraint 123. FIG. 7 is a side view when the second rotation restraint 123 is detached and the extender optical system is further rotated from the state illustrated in FIG. 5. FIG. 8 is a front view of the principal part of the embodiment in the state illustrated in FIG. 7. FIG. 9 is a perspective view of the principal part of this embodiment in the state illustrated in FIG. 7.

As illustrated in FIG. 5, the second rotation restraint 123 is fixed onto the outer circumference of the fixed cylinder 104 from the radial direction to the screw 124 so that the second rotation restraint 123 is detachable. If the second rotation restraint 123 is detached, the holder cylinder 103 can be further rotated from the state illustrated in FIG. 5. Therefore, as illustrated in FIG. 9, the second arm 103b of the holder cylinder 103 is rotated until the second arm 103b contacts the wall portion 104a of the fixed cylinder 104.

At this time, as illustrated in FIG. 8, the seventh lens unit barrel 102 is moved to a position outer than the outer circumference of the fixed cylinder 104, and there is no member to block the before and after the seventh lens unit barrel 102. Therefore, a screw 126 for fixing the seventh lens unit barrel 102 to the holder cylinder 103 is detachable. In other words, without detaching the front relay-lens units (fourth to sixth lens units L4 to L6) and the rear relay-lens unit (eighth lens unit L8), the seventh lens unit barrel 102 is detachable from the holder cylinder 103.

Due to the state illustrated in FIG. 9, the first rotation restraint 122 and the second rotation restraint 123 can be easily replaced without manipulating the main optical system. Therefore, even when destruction or the like occurs due to deterioration with age or repetitive usage, the maintenance can be easily performed.

The second rotation restraint 123 takes a first state for restraining a retreating amount of the seventh lens unit barrel 102 and a second state for increasing the retreating amount of the seventh lens unit barrel 102 so as to make it larger than the retreating amount in the first state. When the second rotation restraint 123 is in the first state, the seventh lens unit L7 is retreated to the position where the seventh lens unit L7 is not associated with the formation of the optical image, and the main optical system blocks the seventh lens unit barrel 102 so as not to be detached from the holder cylinder 103. When the second rotation restraint 123 is in the second state, the seventh lens unit barrel 102 is rotated to the position where the main optical system does not block the seventh lens unit barrel 102 so as to be detached from the holder cylinder 103. In other words, in the first state, the retreating amount of the seventh lens unit barrel 102 is set to an amount required for the normal use. In the second state, the retreating amount of the seventh lens unit barrel 102 is set to an amount required for the replacement (retreating amount where the extender optical system can be replaced without the detachment of any one of optical units before and after the seventh lens unit barrel 102). Therefore, in the normal use period, there is no need to retreat the seventh lens unit barrel 102 larger than the retreating amount required for the normal use. As a result, in the retreat time of the seventh lens unit barrel 102, in comparison with the second state, the size of the direction perpendicular to the optical axis of an interchangeable lens (lens barrel, optical apparatus) 101 in the normal use period can be reduced.

This embodiment fixes the second rotation restraint 123 onto the fixed cylinder 104 through the screw 124 in the first state, and detaches the second rotation restraint 123 from the fixed cylinder 104 due to the detachment of the screw 124 in the second state. However, the present invention is not limited this embodiment.

For example, the second rotation restraint 123 may be installed in the fixed cylinder 104 to be shifted between the first state and the second state (for example, between a protruding state corresponding to the first state and a retreating state corresponding to the second state or between a first position corresponding to the first state and a second position corresponding to the second state). A unit for shifting the second rotation restraint 123 may be automatically or manually driven. A manipulator for manually shifting the second rotation restraint 123 may be installed in the exterior ring 107. In the automatic shifting, the second rotation restraint 123 may be configured to be shifted by an electrical driving unit.

While this embodiment sets the second state to an unrestraint state, the second state may not be an unrestraint state as long as the retreating amount of the seventh lens unit barrel 102 can be larger than the retreating amount in the first state. For example, the second state may be the state illustrated in FIG. 8 where the contact point between the second rotation restraint 123 and the roller 125 illustrated in FIG. 6 is set to be at the outer side. In this case, the contact is unnecessary between the second arm 103b of the holder cylinder 103 and the wall portion 104a of the fixed cylinder 104 illustrated in FIG. 9.

This embodiment restrains the retreating amount of the seventh lens unit barrel 102 due to the contact with the roller 125 when the second rotation restraint 123 is in the first state. However, the present invention is not limited to this embodiment. For example, when the second rotation restraint 123 is in the first state, the retreating amount of the seventh lens unit barrel 102 may be restrained due to the contact with the seventh lens unit barrel 102 or a component connected thereto.

This embodiment restrains the retreating amount of the seventh lens unit barrel 102 due to the contact between the second arm 103b of the holder cylinder 103 and the wall portion 104a of the fixed cylinder 104 when the second rotation restraint 123 is in the second state. However, the present invention is not limited to this embodiment. For example, when the second rotation restraint 123 is in the second state, the retreating amount of the seventh lens unit barrel 102 may be restrained by allowing the fixed cylinder 104 to be in contact with the seventh lens unit barrel 102 or a component connected thereto.

The present invention can provide a lens barrel and an optical apparatus where an extender optical system is replaceable at necessary time in the extender optical system without detaching any one of optical units before and after the extender optical system.

The lens barrel according to the present invention is applicable to a single lens reflex camera, a TV camera, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-250755, filed Nov. 15, 2012 which is hereby incorporated by reference herein in its entirety.

What is claimed is:

1. A lens barrel comprising:
an image-pickup optical system configured to form an optical image of an object, the image-pickup optical system including a main optical system and an extender optical system configured to change a focal length of the image-pickup optical system;
an extender barrel configured to hold the extender optical system;
a housing configured to house the extender barrel;
a rotator configured to:
hold the extender barrel to rotatably support the extender barrel in the housing;
insert the extender optical system into the main optical system; and
retreat the extender optical system from the main optical system; and
a retreat restraint having a first state used to restrain a retreating amount of the extender barrel by the rotator and a second state used to make the retreating amount of the extender barrel larger than that in the first state,
wherein, when the retreat restraint is in the first state, the extender optical system is retreated to a position that is not associated with formation of the optical image, but the extender barrel is undetachable from the rotator, and
wherein, when the retreat restraint is in the second state, the extender barrel is detachable from the rotator.

2. The lens barrel according to claim 1, wherein:
when the retreat restraint is in the first state, the housing blocks the extender barrel, and
when the retreat restraint is in the second state, the extender barrel is allowed to rotate to a position where the housing does not block the extender barrel.

3. The lens barrel according to claim 1, wherein, when the retreat restraint is in the first state, the retreat restraint is allowed to contact the rotator, the extender barrel or a component connected thereto, so that the retreating amount of the extender barrel is restrained.

4. The lens barrel according to claim 1, wherein:
when the retreat restraint is in the first state, the retreat restraint is fixed onto the housing through a screw, and
when the retreat restraint is in the second state, the screw is detached, so that the retreat restraint is detached from the housing.

5. The lens barrel according to claim 1, wherein the retreat restraint is installed in the housing to be shifted between the first state and the second state.

6. The lens barrel according to claim 1, wherein, when the retreat restraint is in the second state, the rotator, the extender barrel, or a component connected thereto is allowed to contact the housing, so that the retreating amount of the extender barrel by the rotator is restrained.

7. The lens barrel according to claim 1, further comprising an insertion restraint that is allowed to contact the extender barrel or a component connected thereto, so that an insertion position of the extender barrel by the rotator is restrained.

8. An optical apparatus comprising:
an image pick-up apparatus; and
a lens barrel including:
an image-pickup optical system configured to form an optical image of an object, the image-pickup optical system including a main optical system and an extender optical system configured to change a focal length of the image-pickup optical system;
an extender barrel configured to hold the extender optical system;
a housing configured to house the extender barrel;
a rotator configured to:
hold the extender barrel to rotatably support the extender barrel in the housing;
insert the extender optical system into the main optical system; and
retreat the extender optical system from the main optical system; and
a retreat restraint having a first state used to restrain a retreating amount of the extender barrel by the rotator and a second state used to make the retreating amount of the extender barrel larger than that in the first state,
wherein, when the retreat restraint is in the first state, the extender optical system is retreated to a position that is not associated with formation of the optical image, but the extender barrel is undetachable from the rotator, and
wherein, when the retreat restraint is in the second state, the extender barrel is detachable from the rotator.

* * * * *